(12) United States Patent
Smith (10) Patent No.: US 7,977,088 B2
(45) Date of Patent: Jul. 12, 2011

(54) BIO-COMPOSTING DOMESTIC WASTE TREATMENT APPARATUS, SYSTEM AND METHOD OF THE SAME

(76) Inventor: Danny Smith, Poca, WV (US)

(*) Notice: Subject to any disclaimer, the term of this patent is extended or adjusted under 35 U.S.C. 154(b) by 313 days.

(21) Appl. No.: 12/391,237

(22) Filed: Feb. 23, 2009

(65) Prior Publication Data
US 2009/0221062 A1   Sep. 3, 2009

Related U.S. Application Data

(63) Continuation-in-part of application No. 11/111,298, filed on Apr. 21, 2005, now Pat. No. 7,494,803.

(51) Int. Cl.
*C12M 1/00* (2006.01)
(52) U.S. Cl. .................. 435/290.1; 435/290.4; 422/272; 210/172.1; 210/306; 210/320
(58) Field of Classification Search .... 435/290.1–290.4; 210/172.1, 306, 320, 613, 615; 422/272
See application file for complete search history.

(56) References Cited

U.S. PATENT DOCUMENTS

| | | | |
|---|---|---|---|
| 7,494,803 B1 * | 2/2009 | Smith | 435/290.1 |
| 2004/0226869 A1 * | 11/2004 | McClure et al. | 210/163 |
| 2005/0274669 A1 * | 12/2005 | Marchesseault et al. | 210/605 |

* cited by examiner

*Primary Examiner* — William H Beisner
*Assistant Examiner* — Michael Hobbs
(74) *Attorney, Agent, or Firm* — Waters Law Group, PLLC; Robert R. Waters; Brian W. Foxworthy (57) ABSTRACT

A solid waste treatment apparatus and/or comprises a tank comprising an interior volume and an outlet and a liner comprising a floor and a plurality of upstanding exterior walls and at least one upstanding interior wall forming a first chamber and a second chamber in the liner. Each one of the exterior walls comprises a permeable surface. The at least one interior wall comprises an impermeable surface. The apparatus includes a multi-panel sieve disposed in the second chamber. A tank includes a removable lid comprising a window in fluid communication with the first chamber and the second chamber. A separator housing may be disposed on the lid and coextensive to the window, the housing comprising a planar sieve disposed at an angle in the housing and an inlet in fluid communication with the planar sieve.

16 Claims, 10 Drawing Sheets

BIO-COMPOSTING DOMESTIC WASTE TREATMENT APPARATUS, SYSTEM AND METHOD OF THE SAME

CROSS-REFERENCE TO RELATED APPLICATIONS

This application is a continuation-in-part of U.S. patent application Ser. No. 11/111,298 filed on Apr. 21, 2005 and issued as U.S. Pat. No. 7,494,803 on Feb. 24, 2009.

BACKGROUND

This application discloses claims and embodiments generally related to an apparatus for treating domestic waste and sewage produced from a residential dwelling.

A residential dwelling possesses a plumbing system for providing water service and removal of domestic and other aqueous waste. In an urban setting, the waste system is connected to the centralized waste system operated by a municipality or city, which receives discharged domestic waste and waste water for treatment and/or collection. In a rural setting, centralized waste water and treatment systems or plants are not feasible or provided. Therefore, on-site waste water treatment and management must be provided to dispose of domestic waste and/or remediate water for use.

Domestic waste generally comprises a mixture of waste solids and water in varying proportions. In on-site systems, the disposal system water is separated from the organic solids. The waste water may be discharged into the local environment. The solid materials may be treated and decomposed within an on-site system. Any remaining untreated or otherwise non-disposable solid waste materials must be hauled off-site for disposal and/or treatment.

A variety of devices and apparatuses have been attempted for collecting and treating on-site domestic waste and sewage produced from a residential dwelling. One common approach is a septic treatment system. A septic treatment system generally includes a septic tank that receives the domestic waste water influent from the residential dwelling. The waste is held quiescently in the tank, permitting most of the solids to settle in the bottom of the tank. The partially clarified water may then be discharged onto the surround property. However, the water effluent still contains some dissolved and entrained solids, and is not sufficiently safe to discharge to surface water(s). Usually, the water effluent is discharged to a leach field and routed into a field of permeable pipes or conduit buried below the surface. The water effluent permeates the walls of the pipe or conduit and into the surrounding subsoil. Any waste remaining in the water effluent is entrained in the surrounding subsoil and gradually decomposed by indigenous soil organisms. The water effluent percolates downward, eventually joining the local ground water table.

However, a leach field may be implemented only where the soil is sufficiently permeable to allow the water effluent to percolate therethrough. Thus, shallow soils, including thin soil layers with bedrock close to the surface, or soils with high clay content, are often not sufficiently permeable and are generally unsuitable for a septic tank system of this type.

Generally, waste solids accumulate in the bottom of a septic tank, and the rate of decomposition is slower than the rate of accumulation because the anaerobic bacteria that consume solid waste are inefficient in consuming the waste material. The serial build-up of non-decomposed solid waste may be pathogenic and cause illness among residents or visitors to the dwelling. Thus, periodic removal and disposal of the accumulated waste must be performed.

Another type of system includes an aerobic activated sludge process. The process usually comprises an apparatus with two chambers. The first chamber has a mixed aqueous slurry of active aerobic bacteria, called activated sludge. Aerobic conditions are maintained in the activated sludge by injecting air by one of several means known in the art. The domestic waste influent is added into and mixed with the activated sludge. Aerobic bacteria absorb and decompose the entrained and dissolved solids in the domestic waste.

A small purge stream exits from the first chamber and into a second chamber with quiescent conditions. The sludge mass in the slurry settles to the bottom of the second chamber while the separated water exits. The activated sludge solids settle faster than the raw solids in domestic waste, so the aqueous effluent from an aerobic treatment apparatus is usually clarified sufficiently to discharge directly to a surface water body. The settled sludge is also non-pathogenic and can be more easily discard, such as implementation of the discard into land-farming.

The aerobic process is more efficient than the anaerobic process, but has a higher initial cost because of the powered machinery required to operate the aeration process. In addition, the cost is increased because of the electricity required to operate the machinery and the periodic maintenance of the machinery.

Another example of devices used for treating domestic waste is composting toilets and waste composting units. Composting decomposes organic solids with aerobic bacteria in a solid mass or pile with little free excess water, as opposed to a slurry or fluid system. In a composting system, the waste pile (devoid of excess free water) has many small voids or pores through which air can circulate allowing oxygen to communicate with the aerobic organisms in the central volumes of the waste pile. The aerobic organisms digest and metabolize waste, reducing its volume and producing more environmentally compatible humus as a final waste product that is more easily disposed.

Accordingly, certain embodiments of the invention represent improvements in the bio-composting of domestic waste through use of a treatment apparatus as disclosed herein.

SUMMARY

In one embodiment, a solid waste treatment apparatus comprises a tank comprising an interior volume and an outlet and a liner comprising a floor and a plurality of upstanding exterior walls and at least one upstanding interior wall forming a first chamber and a second chamber in the liner. Each one of the exterior walls comprises a permeable surface. The at least one interior wall comprises an impermeable surface. The apparatus includes a multi-panel sieve disposed in the second chamber. A tank includes a removable lid comprising a window in fluid communication with the first chamber and the second chamber. A separator housing may be disposed on the lid and coextensive to the window, the housing comprising a planar sieve disposed at an angle in the housing and an inlet in fluid communication with the planar sieve.

In another embodiment, a solid waste treatment apparatus comprises a tank comprising an interior volume and an outlet and a liner comprising a floor and a plurality of upstanding exterior walls and at least one upstanding interior wall forming a first chamber and a second chamber in the liner. Each one of the exterior walls comprises a permeable surface. The at least one interior wall comprises an impermeable surface. A multi-panel sieve disposed in the second chamber may be included. The tank may include a removable lid comprising a window in fluid communication with the first chamber and the second chamber. The tank may also include a soffit intermediately disposed between the window and the interior wall. A separator housing disposed on the lid may comprise a translucent material and may be coextensive to the window, the housing comprising a planar sieve disposed at an angle in the housing and an inlet in fluid communication with the planar sieve.

In another embodiment, a waste treatment system comprises a tank comprising an interior volume and an outlet and a liner comprising a floor and a plurality of upstanding exterior walls and at least one upstanding interior wall forming a first chamber and a second chamber in the liner. Each one of the exterior walls comprises a permeable surface. The at least one interior wall comprises an impermeable surface. The apparatus tank may also include a multi-panel sieve disposed in the second chamber and a removable lid comprising a window in fluid communication with the first chamber and the second chamber. A separator housing disposed on the lid and coextensive to the window may be included, the housing comprising a planar sieve disposed at an angle in the housing and an inlet in fluid communication with the planar sieve. The system may include a water treatment apparatus in fluid communication with the outlet, the water treatment apparatus comprising at least one pod disposed in a channel comprising a layer of a water treating agent surrounding the at least one pod, the at least one pod having a plurality of voids for the water to exit the at least one pod into the agent.

When waste solids are sufficiently well-drained and supplied with sufficient oxygen, naturally occurring flora or fauna can digest and eliminate a substantial volume of waste. In composting systems commonly available in the art, aerobic bacteria and protozoa are the principal flora and fauna relied upon for bio-decomposition. However, other lesser known fauna are available, including members of the species *Mycetophilidae* and *Sciaridae*, commonly referred to as fungus gnats. Fungus gnats infest and consume sources of organic matter, include human solid waste material. The fungus gnats utilized herein remove a substantial portion of the toxins and odors from human solid waste and provide an effective agent for decomposing such matter so that the apparatus and system disclosed herein is an attractive and effective alternative for addressing rural solid waste accumulation in which a centralized treatment facility is not available or practicable.

DESCRIPTION OF THE EMBODIMENTS

As used herein, the term "outboard" refers to a horizontal direction towards the sidewalls 10 and away from the center longitudinal axis of the bio-composting domestic waste treatment apparatus, system and method of the same.

The term "inboard" refers to a horizontal direction towards the center longitudinal axis and away from the sidewalls of the bio-composting domestic waste treatment apparatus, system and method of the same.

Figure 1:
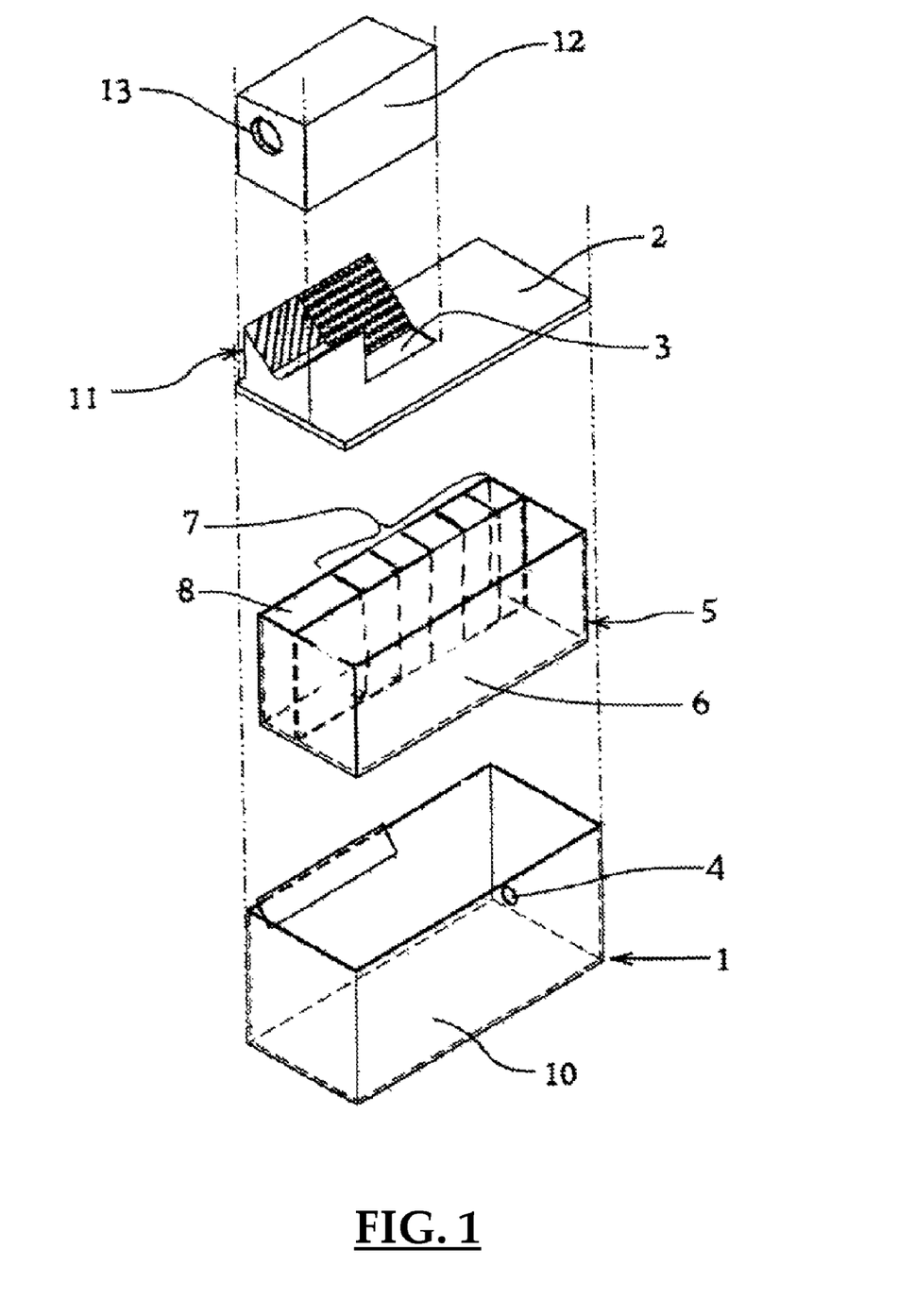
FIG. 1 is an exploded perspective view of a bio-composting waste treatment apparatus.

As shown in FIG. 1, a bio-compositing domestic waste treatment apparatus is comprised of a tank 1, a multi-chambered liner 5 and a separator assembly 11. The tank 1 is preferably a rectangular box with a solid floor, vertical sidewalls 10 and a removable lid 2 disposed on the top edges of the sidewalls 10. A rectangular opening 3 in the lid 2 is disposed proximate to one end and offset laterally fro the longitudinal centerline of the lid 2. An outlet 4 is disposed near the bottom of the sidewall 10 at the end opposite that of the rectangular opening in the lid 2. The tank 1 may be constructed from one of many suitable structural materials, including fiberglass, plastic resin, corrosion-resistant metals, or coated metals.

Figure 2:
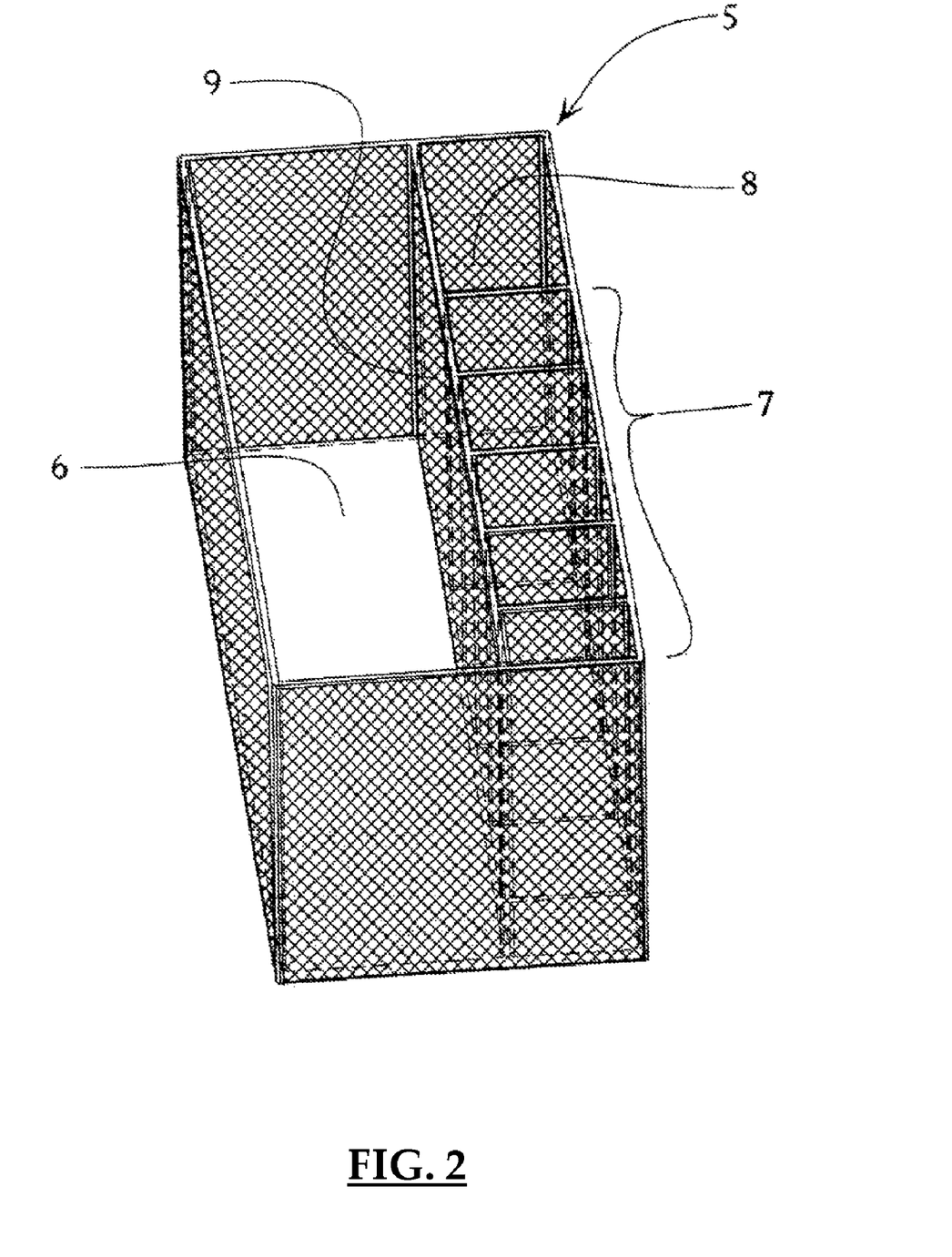
FIG. 2 is a perspective view of FIG. 1 with the tank and separator cover removed.

Disposed within the tank 1 is a multi-chambered liner 5. The liner 5 possesses dimensions in length and width that are slightly less than the dimensions of the interior of the tank 1, creating a small interstitial void between the sides of the line 5 and the interior of the sidewalls 10 of the tank 1. As depicted in FIG. 2, the liner 5 has a floor and permeable walls. The liner 5 is divided medially along its length by a vertical partition 9 into a first chamber 6 on one side, traversing the length of the liner 5, and by additional vertical partitions 9 into a series of sub-chambers along the length of the liner 5 on the other side. The sub-chambers second side comprises a larger first sub-chamber 8 and a series of small sub-chambers 7.

The liner 5 is illustrated in FIG. 2. In one embodiment, the floor of the liner 5 is solid. In another embodiment, the floor of the liner 5 is semi-permeable or permeable.

The walls of the liner 5 are permeable as well. The walls may be constructed in a manner similar to the partitions 9, and possessing effective openings of approximately ⅜".

The partitions 9 between the several chambers are each permeable. The partitions 9 may be constructed of flat sheet stock, and may include material such as HDPE, polypropylene or other suitably rigid plastic. Thereon a plurality or matrix of openings may be cut or stamped. Between the first sub-chamber 6 and the first series of smaller sub-chambers 7, the partition 9 may have effective openings of approximately ⅝". The partition 9 between the first two smaller sub-chambers 7 may have ⅝" inch openings as well. The partitions 9 between the remaining smaller sub-chambers 7 may have effective openings of approximately ⅜". It is also envisioned that each of the openings in the various partitions and sub-chambers may have diameters larger or smaller than those stated herein. It is also envisioned that each of the openings in the various partitions and sub-chambers may have a plurality of differently sized dimensions.

As depicted in FIG. 1, a removable lid 2 is disposed on top of the tank 1 that encloses the liner 5. The opening 3 in the lid 2 is disposed in the lid 2 proximate to an end opposite the end adjacent the outlet 4 and offset laterally to one side from the longitudinal centerline of the lid 2. The separator assembly 11 sits above the opening 3 and is enclosed by the separator housing 12. The width of the separator housing 12, and the opening 3, is slightly more than half the width of the liner 5 and as long as the first three of the sub-chambers 7. The housing 12 has an inlet 13 near the end adjacent the end of the tank 1. A hinged lid may comprise the top surface having a slope (approximately 1:10) downwardly towards the outboard side of the housing 12. The walls and lid of the housing 12 is fabricated of a clear or translucent material, preferably HDPE or a polyacrylic resin. The clear or translucent material allows entry of light into the first chamber 6, which promotes the population of fungus gnats in the housing 12.

The lid 2 may be removably attached to the housing 12, such as by flange along the bottom perimeter of the walls of the housing 12. The lid 2 may be attached by one or mechanical fasteners, such as a screw.

Figure 3:
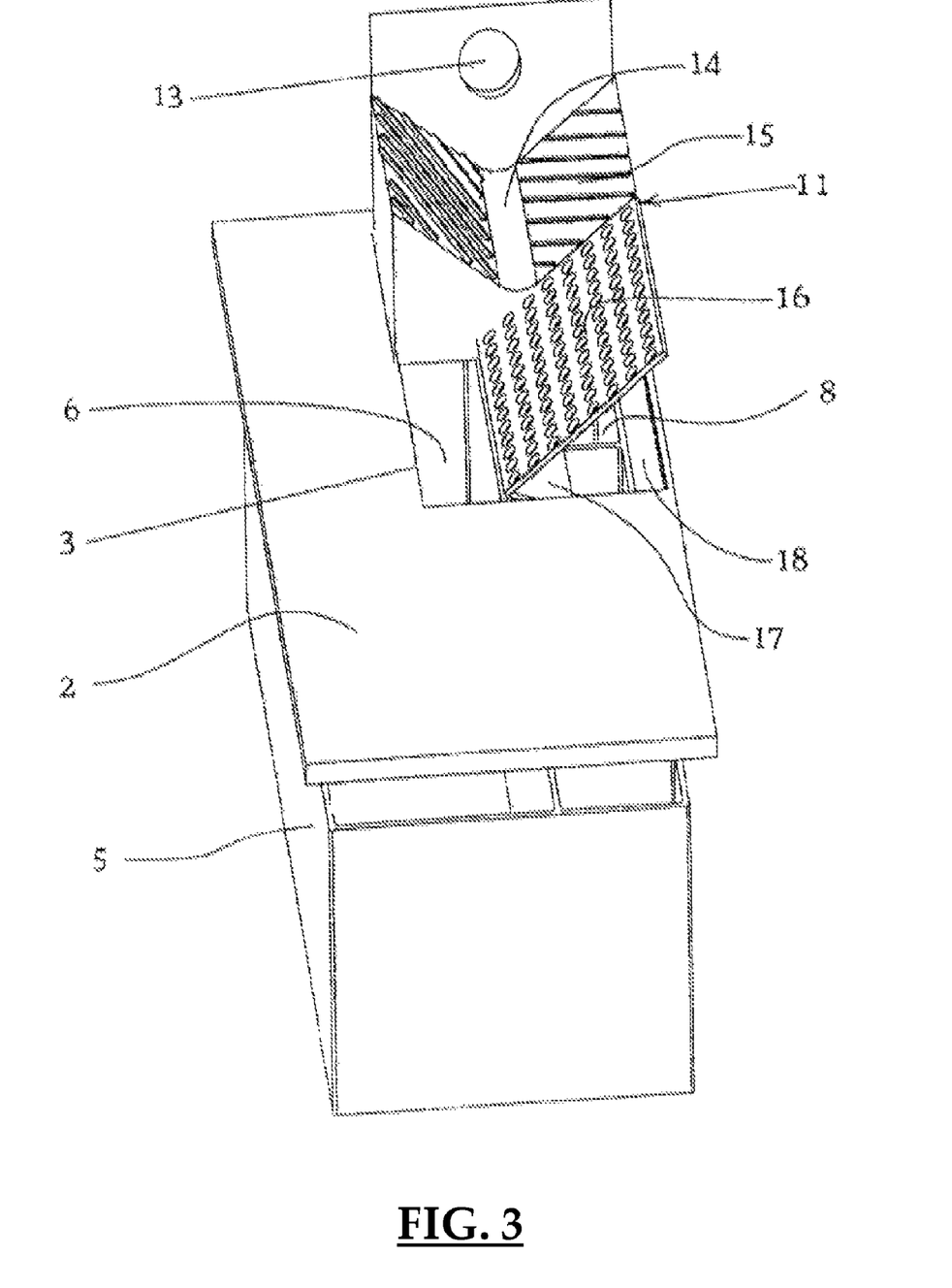
FIG. 3 is a perspective view of the separator assembly.
Figure 4:
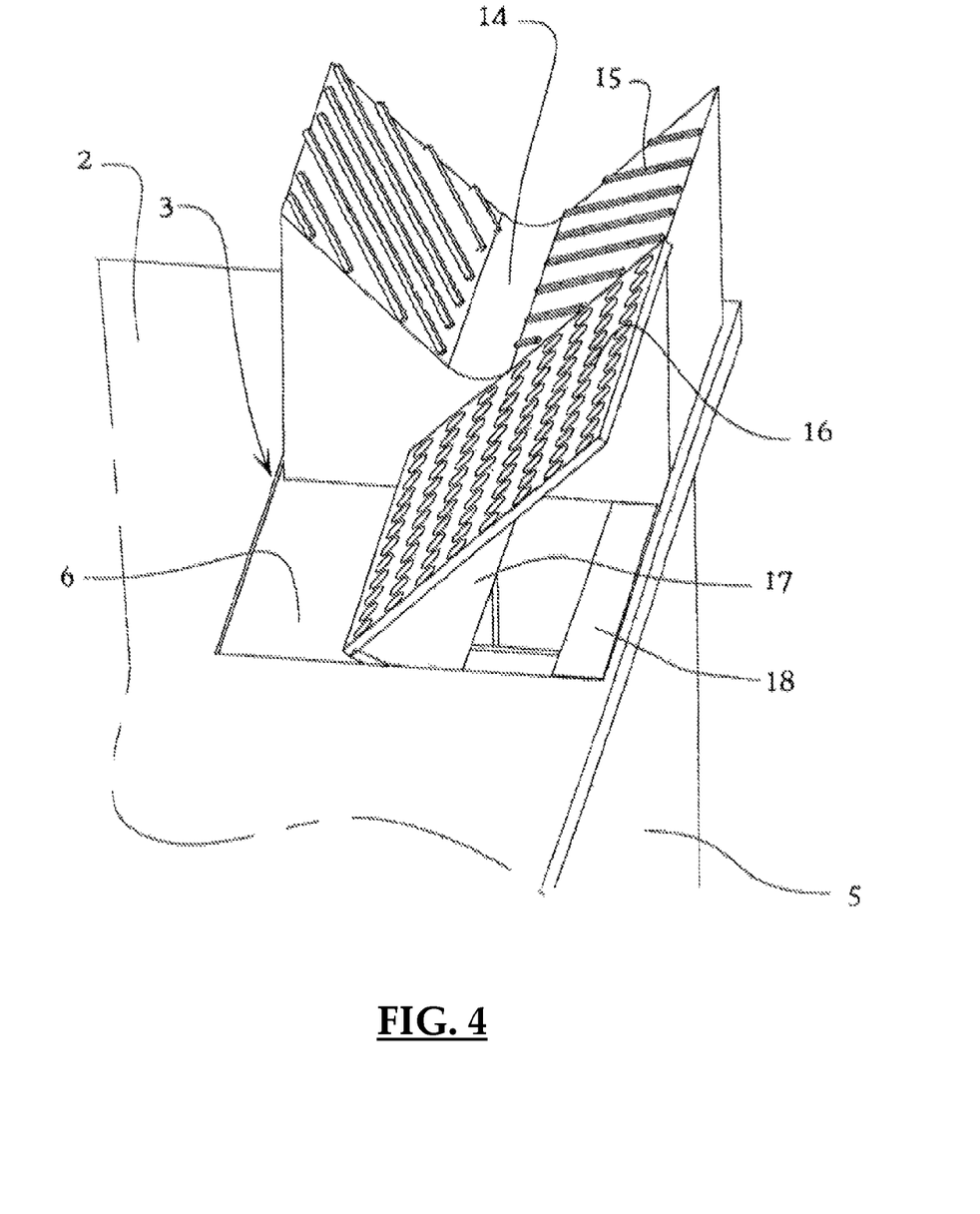
FIG. 4 is a second perspective view of the separator assembly.

The assembly 11 resides within the housing 12, the assembly 11 having a sluice 14, an inclined sieve 16 and a first slide 17. The sluice 14 may be disposed inside the housing 12 positioned adjacently to the inlet 13, with the sluice 14 generally subjacent to the inlet 13. As depicted in FIG. 3 and FIG. 4, the sluice 14 may have a concave upper surface, the median of which is aligned with the center of the inlet 13 traversing approximately ⅓ the length of the assembly 11. A plurality of ribs 15 project upward from the upper surface of the sluice 14, wherein the ribs 15 may be angled toward the outboard side of the housing 12. In one embodiment, the ribs 15 may be angled at 45° relative to the longitudinal axis of the sluice 14.

An inclined sieve 16 may be disposed at or near the end of the sluice 14. The sieve 16 may be constructed similarly to the partitions 9, comprising a flat plate or sheet with a plurality or matrix of openings disposed therein to allow passage of water and retaining solids along its surface. The upper surface is smooth to reduce the friction on solids sliding down its surface. The sieve 16 may comprise a rectangular shape and inclined downward in the inboard direction orthogonally to the longitudinal axis of the sluice 14. The upper edge is collinear with the upper edge of the outboard side of the sluice 14. The upper surface of the sieve 16 is coplanar with the surface of the outboard side of the sluice 14, thereby presenting a continuous planar surface between the outboard half of the sluice 14 and the upper section of the sieve 16.

The width of the assembly 11 may be slightly greater than one-half the width of the lid 2. The lower edge of the sieve 16 may extend sufficiently beyond the longitudinal partition 9 between the first chamber 6 and the smaller sub-chambers 7, assuring that the dewatered solids fall solely into the first chamber 6. A first slide 17 may be provided below the inboard half of the sieve 16 to direct separated water into the first several of the sub-chambers 7,8 provided, and to prevent waste water entry into the first chamber 6. The slide 17 is inclined downward slightly to the outboard side. The inboard edge of the slide 17 conjoins with the lower inboard edge of the sieve 16 forming a seamless edge.

To inhibit waste water falling from the slide 17, or from the upper parts of the sieve 16, a second slide 18 is provided directly in the interstitial space(s) between the liner 5. The slide 18 extends from the outboard edge of the opening in the lid 3 and extends inboard and downward into the volume of the tank 1 below the sieve 16. The lower inboard edge of the slide 18 is disposed approximately medially above the sub-chambers 7,8

Figure 6:
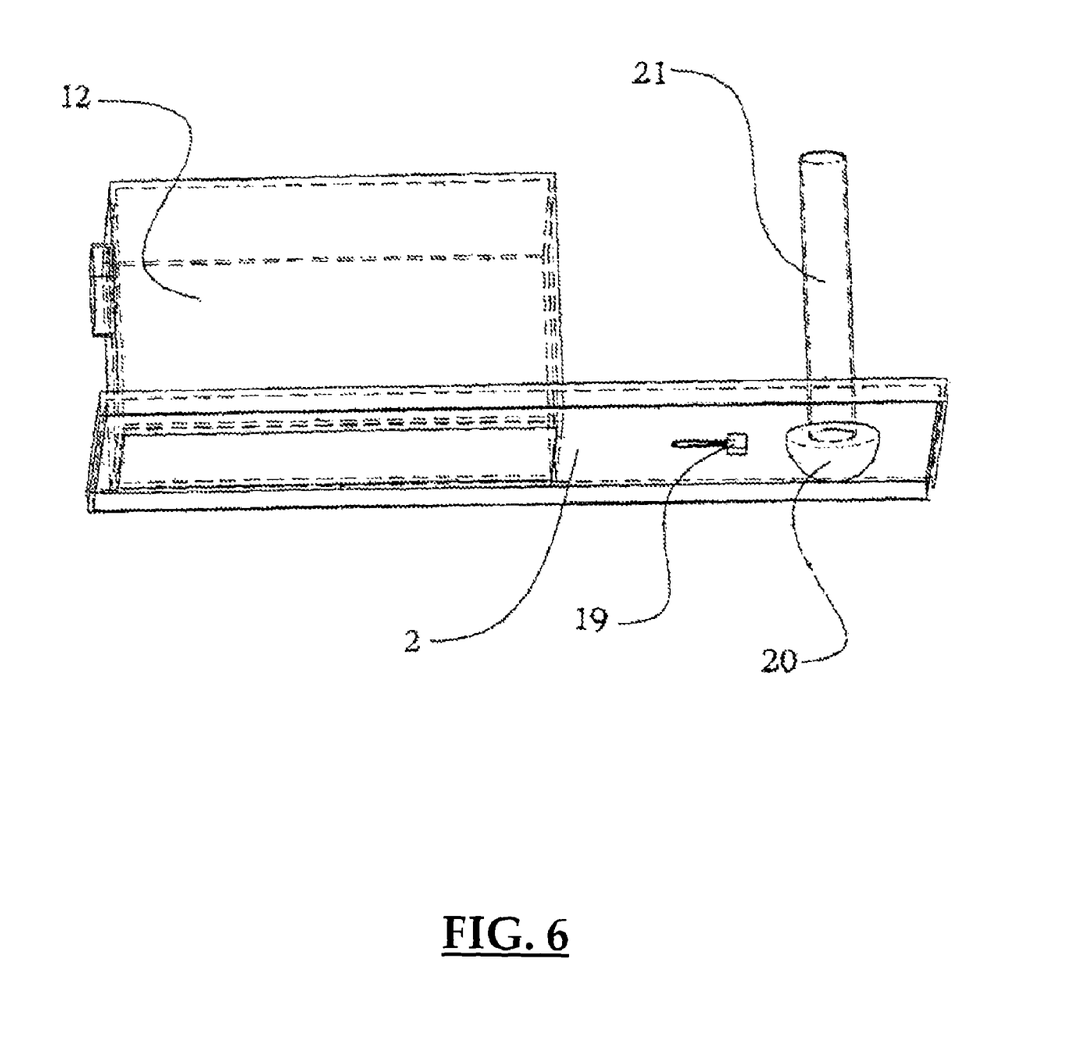
FIG. 6 is a perspective view of the underside of the lid.

As depicted in FIG. 6, a plurality of additional accessories may be included in the apparatus 10, system or as part of the method described herein. One additional accessory may be an electric heater 19 and/or a calcium chloride additive system.

The heater 19 assists in maintaining an adequate temperature for the bio-composting agents during the winter months in colder environments. The apparatus 10 may be installed into the ground about to the level of the lid 2. Heat may dissipate through the lid 2 during colder temperature episodes, reducing the temperature within the apparatus 10. The heater 19 may provide sufficient additional heat to compensate for the heat dissipation loss because of the lid 2.

The calcium chloride additive system may provide a permeable basket 20 inside the volume of tank 1 containing calcium chloride tablets, which may be used to reduce offensive odors produced in the bio-composting process. The tablets may further aid in the production of additional heat by the absorption of moisture in the vapor space of the tank 1. The tablets may be inserted into the baskets 20 through a vertical charge pipe 21 in fluid communication therewith through and above the lid 2.

The calcium chloride additive system may comprise a semispherical permeable basket 20 disposed on the lower surface of the lid 2. A hole or opening may be provided or disposed in lid 2, medially above the basket 20. A pipe 21 may be provided wherein the lower end registers with the opening and extends to a height above the lid 2 sufficient for comfortable charging of calcium chloride tablets through the upper end. A cap may be provided to the upper end of the pipe 21 to prevent entry or ingress or precipitation or undesirable agents when not in use.

Figure 5:
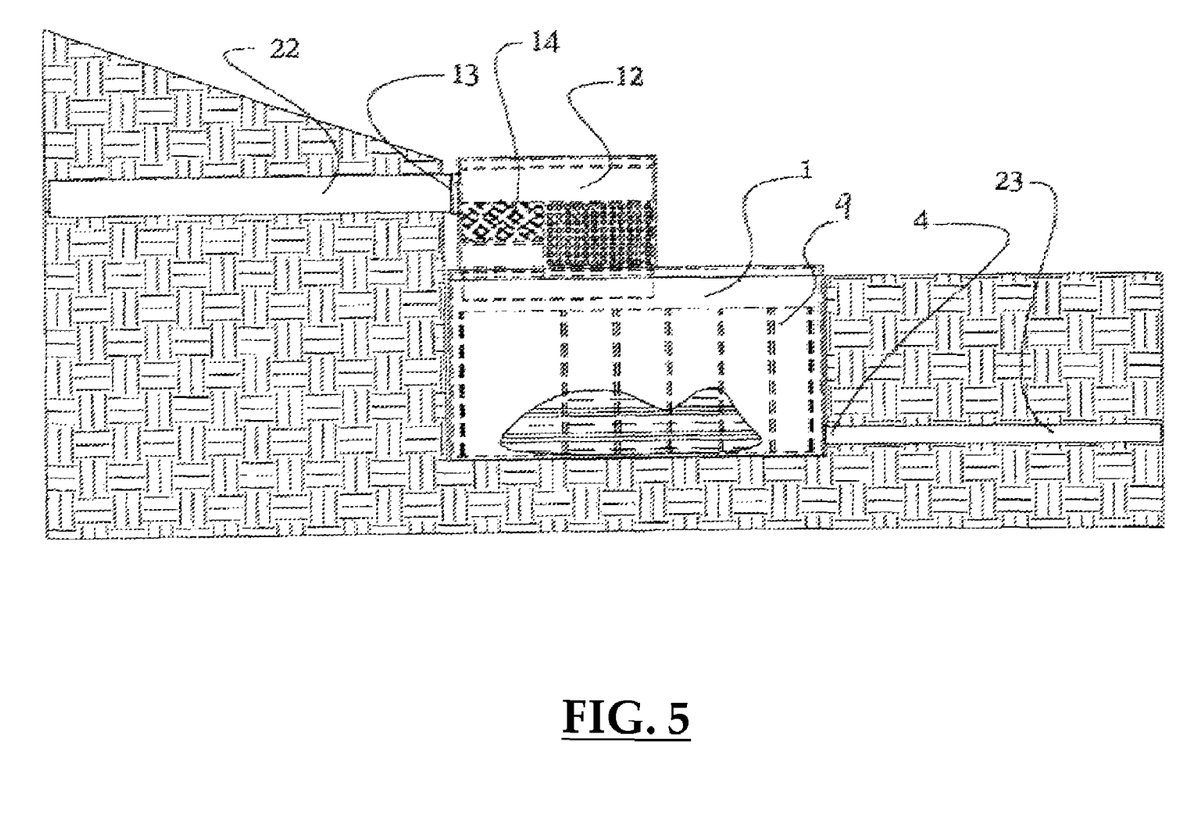
FIG. 5 is an elevational view of the apparatus installed.

As depicted in FIG. 5, the apparatus 10 is placed in service by excavating a pit in the ground to the dimensions of the tank 1. The tank 1 is lowered into the pit, with the upper surface of the lid 2 approximately flush with the surrounding ground level. The end of the waste drain line 22 carries waste from a residential dwelling and is registered with the inlet 13 of the separator. An outlet pipe 23 is coupled to the outlet 4 of the tank 1, and is routed to a suitable means for final disposal, such as in a leach field or discharge to surface waters in compliance with applicable environmental codes or regulations.

In one embodiment, a few tablets of calcium chloride may be charged to the upper end of the pipe 21. Waste if introduced into the separator, flowing across the sluice 14. As depicted in FIG. 3 and FIG. 4, the ribs 15 on the surface of the sluice 14 divert the incoming waste stream up the outboard side of the sluice 14 in an arcing trajectory, and then runs downward across the upper surface of the sieve 16. The momentum imparted by the ribs 15 assist in pushing the dewatered solids down the surface of the sieve 16, which then drops off the lower inboard edge into the first chamber 6 of the liner 5. The waste water separated by the sieve 16 drops through the openings impinging upon the first or second, or both, slides 17 and/or 18, before dropping into one of the first three sub-chambers 7. Because of the size of the openings of the sieve 16, the separated waste water may still possess small entrained solids. These solids are removed by the partitions 9 as the waste water proceeds through the other sub-chambers 7,8. The waste water permeates through the liner 5 walls surrounding the smaller chambers 7,8 and into the interstitial space between the interior of the sidewall 10 and the exterior of the liner 5. The waste water then flows to the outlet 4 and out for final disposal.

The dewatered solid waste slides off the lower edge of the sieve 16 into the first chamber 6. Any residue free water in the waste solids can drain through the permeable walls and into the one of the sub-chambers 7, 8 or into the interstitial space between the liner 5 and the interior of the tank sidewall 10. Within the first chamber 6, the waste solids accumulate and are decomposed by micro agents or organisms, including such agents as fungus gnat larva. Field trials have demonstrated that a population of fungus gnat larvae can digest and remove domestic waste solids faster than its generation rate in a typical single family residence. When the apparatus 10 is first installed, an initial population of fungus gnat flies must be introduced into the system. This may be easily accomplished by leaving the lid 2 open for several days after startup, or by introducing a starting culture or larvae.

In some instances, fungus gnats have found their way into the apparatus through available cracks, gaps or spaces in the mating surfaces. Despite the low odor produced by the system, adult gnats had little difficulty in finding entry to the composting waste. Once there, the gnats begin a continual life cycle, whereby eggs are laid by adults in the waste solids that later hatch into larvae. The larvae ingest and consume the waste solids. When the larvae have sufficiently grown, they pupate and yield adult gnats. The adults generally remain within the apparatus 10 when organic waste solids and light are present, repeating the egg laying, hatching and growing life cycle. Eventually, the waste solids are reduced by the fungus gnat larvae into a thin, non-pathogenic layer at the bottom of the first chamber 6. Any accumulated solids in the first chamber 6 may be removed by removing the lid 2 and then removing the waste solids.

In another embodiment, depicted in FIG. 7 through FIG. 11, a solid waste treatment apparatus 100 comprises a tank 110, a liner 120, a lid 130, a separator housing 140 and a multi-panel sieve 150. The tank 110 comprises an interior volume defined by the upstanding wall(s) of the tank. An outlet 112 is disposed on the tank 110 to provide egress from the interior volume to an external source, including conduit, additional treatment or storage vessel(s) and/or the environment. The liner 120 comprises a floor 122 and a plurality of upstanding exterior walls 124 and at least one upstanding interior wall 126 forming a first chamber 128 and a second chamber 129 in the liner 120.

Figure 7:
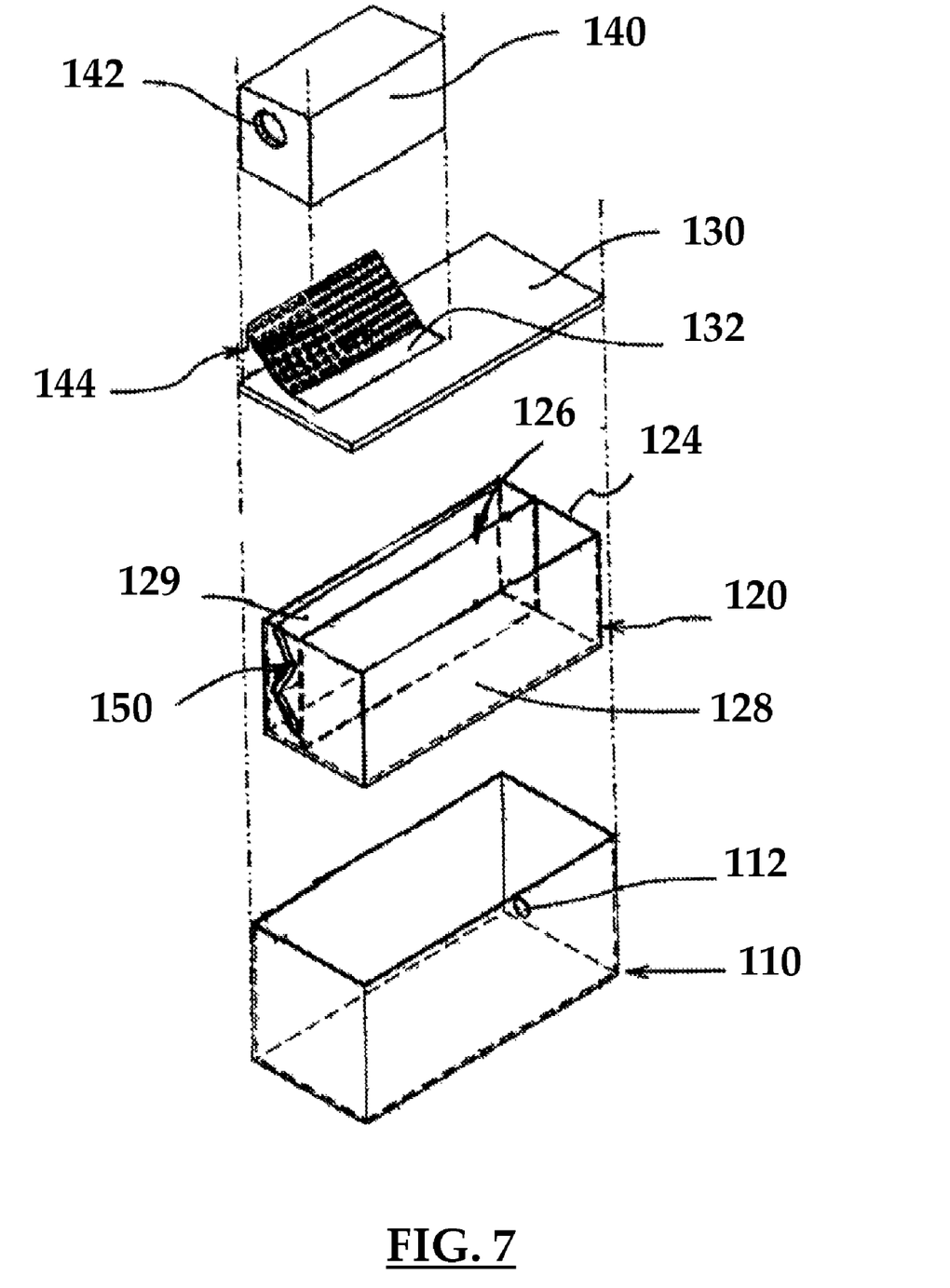
FIG. 7 is an exploded perspective of a bio-composting waste treatment apparatus.
Figure 8:
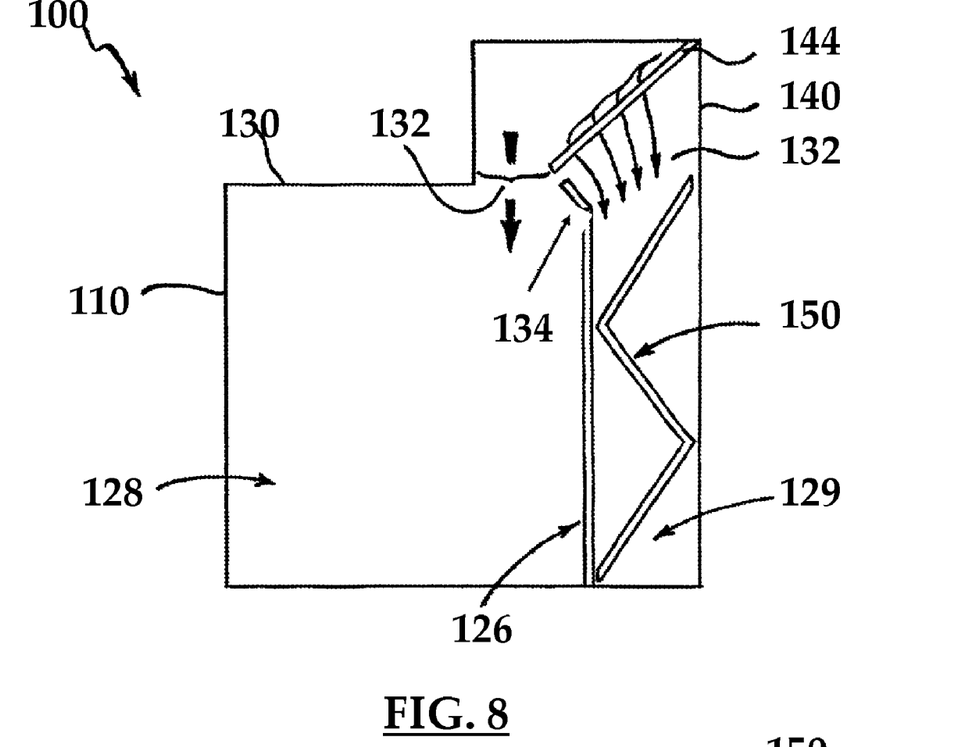
FIG. 8 is side view of a bio-composting waste treatment apparatus.

The lid 130 is removable from the tank 110 to provide access to the interior volume and inner components of the tank 110. The lid 130 comprises a window 132 in fluid communication with the first chamber 128 and the second chamber 129. A soffit 134 may be intermediately disposed between the window 132 and the interior wall 126. The soffit 134 may be disposed at an angle incident to the top of the interior wall 126 as well as the lower edge of the planar sieve 144 (described in more detail below). In one embodiment, the soffit 134 may be a separate element, and in another embodiment, the soffit 134 may be integral to the planar sieve 144. In this arrangement, the soffit 134 provides a barrier for segregating the first chamber 128 from the second chamber 129, and prevents solid waste that travels down the sieve 144 (as described below) from inadvertently entering into the second chamber 129 through any gaps or spaces at or near the top of the interior wall 126 and the underside of the lid 130.

Each one of the exterior walls 124 comprises a permeable surface, allowing excess water to separate from the solid waste material. The permeable surface may comprise a variety of materials or configured in a variety of ways. For example, one embodiment envisioned comprises a plurality of openings or holes through the surface of the walls 124 to permit egress of the excess water.

The interior wall 126 comprises an impermeable surface. The impermeable surface completely segregates the first chamber 128 from the second chamber 129. The first chamber 128 predominantly retains solid waste material for decomposition via the agents described above in the prior embodiments (e.g. fungus gnats). The second chamber 129 facilitates fluid communication of water through the system, though any remaining entrained solid waste material may be removed through additional sieve-like filtering of the liquid passing therethrough.

Figure 9:
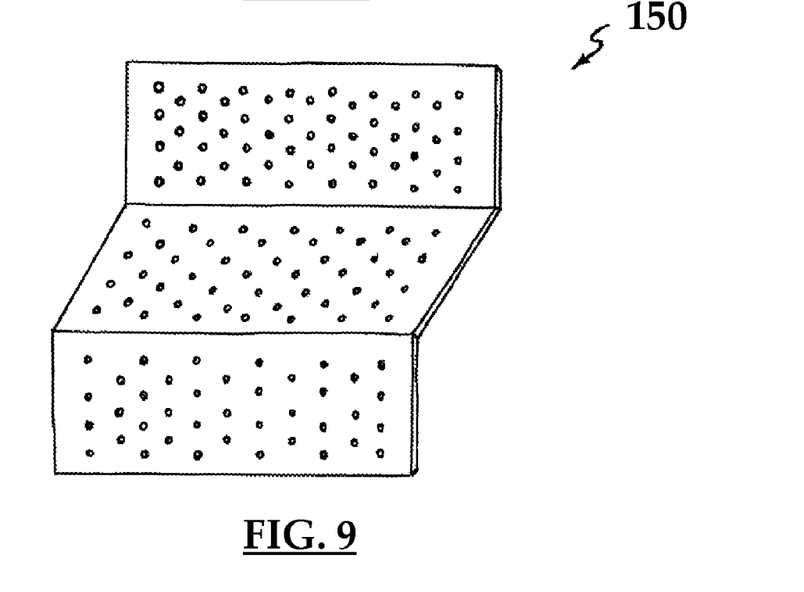
FIG. 9 is a perspective view of a multi-panel sieve.

It is envisioned that a multi-panel sieve 150 is provided and inserted into the second chamber 129 to achieve the sieve-like filtering of the liquid entering. The sieve 150 may comprise at least two panels, but is envisioned to include as many panels as may be practicable to produce and use in this system. It is envisioned that an optimal number of panels lies within the range of two to five. FIG. 9 depicts a tri-panel sieve 150 in which each panel forms an approximate 45° angle incident to the adjacent panel. The surface of each panel may comprise a plurality or matrix of openings or holes, similar to that provided on the surface of the walls 124, allowing egress of water and other materials communicated therewith. The sieve 150 may be periodically removed or rinsed to remove any solid waste material residue that was captured by the sieve 150.

The separator housing 140 comprises a translucent material disposed on the lid 130. The housing 140 is generally co-extensive to the window 132 in that the perimeter of the housing 140 is cooperatively dimensioned so that all waste material entering the housing 140 through inlet 142 is generally discharged through window 132. Conduit in fluid communication with inlet 142 may be provided at a downward slope of at least one inch downward per ten feet of length, and more preferably at least three inches downward per ten feet of length. The housing 140 also comprises a planar sieve 144 disposed at an angle in the housing 140, the sieve 144 comprises a plurality openings (similar to the holes of walls 124). The inlet 142 is in fluid communication with the planar sieve 144, wherein the inbound current of waste material communicates with sieve 144. The liquid waste passes through one or more of the plurality openings in sieve 144 and falling into the second chamber 129. The solid waste will generally have its progress or movement impeded by the sieve 144, with the bulk of the solid waste mass moving along the slope of the planar sieve 144 downwardly toward and through the window 132 and into the first chamber 128, which collects the solid waste material for decomposition through natural agents (e.g. fungus gnats).

The quantity of water and solid waste material forced into the apparatus 100 does not unnecessarily force this material through the apparatus 100 before decomposition of the solid waste material or purification of the water effluent. The apparatus 100 and system is designed and intended to decompose the material and cleanse the water material and provide a low to light volume of water exiting the apparatus 100 downstream for discharge or additional purification. By volume, the expected or anticipated flow rate of water and liquid from the apparatus 100 coupled to a residential dwelling is between 10 mL and 250 mL per minute.

Figure 10:
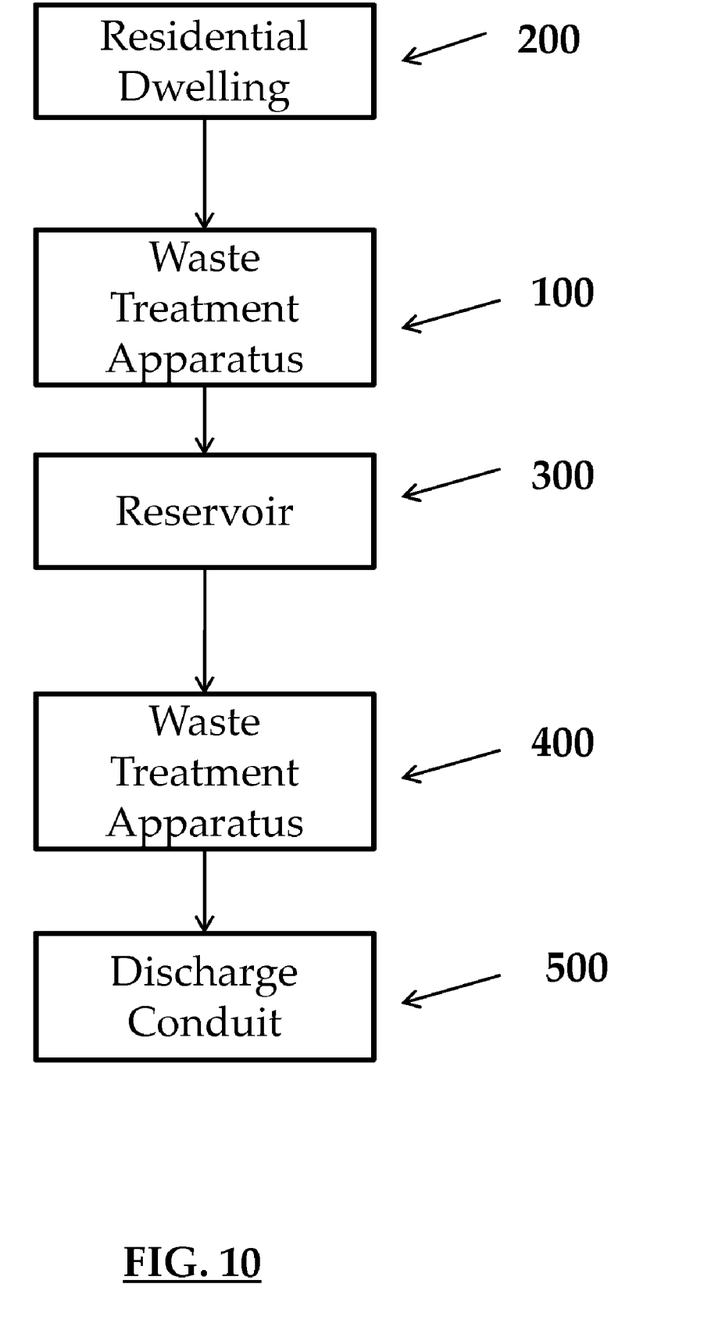
FIG. 10 is schematic illustrating the possible steps of a waster and/or water treatment arrangement consistent with that disclosed herein.

FIG. 10 depicts a system for generally purifying waste material collected from a residential dwelling, wherein the system decomposes solid waste material and purifies the water for circulation back into a water supply or for other uses. A residential dwelling 200 is coupled to the apparatus 100. In one embodiment, the apparatus 100 may be coupled to a storage reservoir or vessel (at 300) that includes the use of an additive treatment, such as the calcium chloride treatment described above in prior embodiments. The reservoir or vessel may be further coupled to a water treatment apparatus (at 400) consistent with the apparatus described below and associated with FIG. 11. The system may be further coupled to a plurality of conduits arranged in a bed for discharge into the soil or to the surface (at 500). The bed may comprise one or more leach bed or field systems, including materials within leach bed/field systems that may be commercially purchased and installed. It is further envisioned that additional purification agents, such as the sphagnum moss or other similar materials may be included within the leach bed to further enhance impurity extraction from the outbound water.

Figure 11:
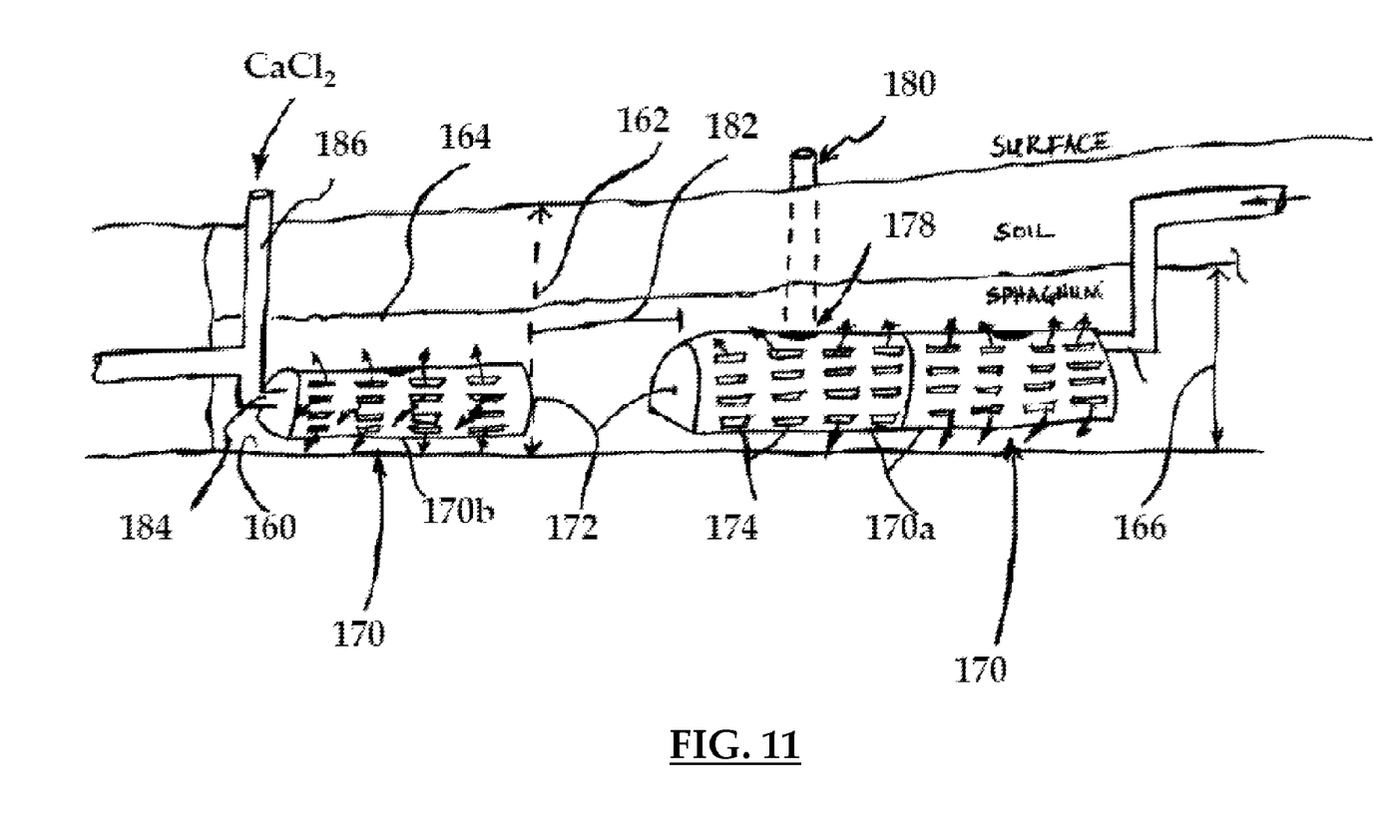
FIG. 11 is a schematic of one embodiment of a water treatment apparatus downstream of a bio-composting waste treatment apparatus.

FIG. 11 depicts additional treatment of the water and material therein downstream from the apparatus 100. One embodiment may include the excavation of one or more furrows or channels 160 having a height of between eighteen and thirty-six inches, generally and denoted by reference character 162, below the surface of the ground. One or more pods 170 may be buried in the channel 160 by a combination of sphagnum (peat) moss 164 or other water treating agent and soil. In one embodiment, the layer of sphagnum 164 may be at least six inches 166 about the outer exposed circumference of each pod 170 provided. A conduit disposed between the outlet 112 of tank 110 and a pod 170 terminates at an inlet 176 in fluid communication with an end or segment of the pod 170.

Each pod 170 may comprise a variety of geometries, including cylindrical and other semi-cylindrical forms as depicted. In the embodiment depicted, each pod 170 is enclosed at each end by a non-permeable cap 172 that inhibits egress of the water or liquid material from the pod 170 before filtering by the sphagnum material. A plurality of louvers or voids 174 are disposed on the circumference of each pod 170, the voids 174 providing the egress of water or liquid from the pods 170. Directional arrows flowing from within the pods 170 are depicted indicating directional flow of the water or liquid through the voids 174 and into the surrounding layer of sphagnum. Each pod 170 may include a port 178 having a removable cap or seal, which may be removed to couple a pipe 180 or conduit therewith for flushing any accumulated waste or debris from within the pods 170 during periodic maintenance of the system.

In one embodiment, and as depicted in FIG. 11, a channel 160 may receive a plurality of pods 170 in various configurations. For example, a pair of pods 170a may be aligned and coupled end-to-end, with an inlet 176 in fluid communication with one end of the pod 170 combination. A second pod 170b may be placed in the channel 160, with a distance 182 separating the pods 170a and 170b, wherein the distance 182 may comprise approximately eighteen to thirty-six inches, and generally depicted as approximately twenty-four inches. An outlet 184 in fluid communication with one end of pod 170b is positioned approximately four inches below the inlet 176. This vertical offset promotes migration of the water or liquid from the inlet end toward the outlet end. A vertical pipe or conduit 186 may be provided for administration of a calcium chloride additive treatment of the water or liquid therein.

Thus, a quantity of water exits the tank 110 through outlet 112 and enters one or more pods 170a downstream via outlet 176. The layer of sphagnum 164 acts as a purifying or treatment agent on the water and liquid moving through the pod 170a before exiting through one or more voids 174 and into the sphagnum layer 164 comprehensive treatment. The water moves through the layer 164 downstream and enters the pod 170b through voids 174 before exiting through outlet 184. Optionally, one or more calcium chloride (or other chemical additive treatment(s)) may be utilized via the conduit 186 before the final product is moved further downstream into a storage reservoir or discharged into portable containers or the environment.

It is to be understood that the embodiments and claims are not limited in application to the details of construction and arrangement of the components set forth in the description and illustrated in the drawings. Rather, the description and the drawings provide examples of the embodiments envisioned, but the claims are not limited to any particular embodiment or a preferred embodiment disclosed and/or identified in the specification. The drawing figures are for illustrative purposes only, and merely provide practical examples of the invention disclosed herein. Therefore, the drawing figures should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

Furthermore, the Abstract is neither intended to define the claims of the application, nor is it intended to be limiting to the scope of the claims in any way. It is intended that the application is defined by the claimed appended hereto.

What is claimed is:

1. A solid waste treatment apparatus comprising:
   a tank comprising an interior volume and an outlet;
   a liner comprising a floor and a plurality of upstanding exterior walls and at least one upstanding interior wall forming a first chamber and a second chamber in the liner;
   each one of the exterior walls comprising a permeable surface;
   the at least one interior wall comprising an impermeable surface;
   a multi-panel sieve disposed in the second chamber;
   a removable lid disposed on the tank, the lid comprising a window in fluid communication with the first chamber and the second chamber;
   a separator housing disposed on the lid and coextensive to the window, the housing comprising a planar sieve disposed at an angle in the housing and an inlet in fluid communication with the planar sieve.

2. The apparatus of claim 1, wherein the multi-panel sieve comprises at least three panels.

3. The apparatus of claim 2, wherein the multi-panel sieve comprises at least four panels.

4. The apparatus of claim 1, wherein the separator housing comprises a translucent material.

5. The apparatus of claim 1, wherein the planar sieve comprises a lip disposed on the underside of the planar sieve at an angle incident.

6. The apparatus of claim 1, wherein the first chamber comprises a solid waste chamber.

7. The apparatus of claim 1, wherein the second chamber comprises a liquid waste chamber.

8. A solid waste treatment apparatus comprising:
   a tank comprising an interior volume and an outlet;
   a liner comprising a floor and a plurality of upstanding exterior walls and at least one upstanding interior wall forming a first chamber and a second chamber in the liner;
   each one of the exterior walls comprising a permeable surface;
   the at least one interior wall comprising an impermeable surface;
   a multi-panel sieve disposed in the second chamber;
   a removable lid comprising a window in fluid communication with the first chamber and the second chamber;
   a soffit intermediately disposed between the window and the interior wall;
   a separator housing comprising a translucent material disposed on the lid and coextensive to the window, the housing comprising a planar sieve disposed at an angle in the housing and an inlet in fluid communication with the planar sieve.

9. The apparatus of claim 8, wherein the multi-panel sieve comprises at least three panels.

10. The apparatus of claim 9, wherein the multi-panel sieve comprises at least four panels.

11. The apparatus of claim 8, wherein the separator housing comprises a translucent material.

12. A waste treatment system comprising:
a tank comprising an interior volume and an outlet;
a liner comprising a floor and a plurality of upstanding exterior walls and at least one upstanding interior wall forming a first chamber and a second chamber in the liner;
each one of the exterior walls comprising a permeable surface;
the at least one interior wall comprising an impermeable surface;
a multi-panel sieve disposed in the second chamber;
a removable lid comprising a window in fluid communication with the first chamber and the second chamber;
a separator housing disposed on the lid and coextensive to the window, the housing comprising a planar sieve disposed at an angle in the housing and an inlet in fluid communication with the planar sieve;
a solid waste decomposition agent;
a water treatment apparatus in fluid communication with the outlet, the water treatment apparatus comprising at least one pod disposed in a channel comprising a layer of a water treating agent surrounding the at least one pod, the at least one pod having a plurality of voids for the water to exit the at least one pod into the agent.

13. The system of claim 12, wherein the multi-panel sieve comprises at least three panels.

14. The system of claim 13, wherein the multi-panel sieve comprises at least four panels.

15. The system of claim 12, wherein the separator housing comprises a translucent material.

16. The system of claim 12, wherein the solid waste decomposition agent comprising a member of the species selected from *Mycetophilidae* and *Sciaridae*.

* * * * *